& # # # United States Patent [19]

Rutter

[11] Patent Number: 6,145,632
[45] Date of Patent: Nov. 14, 2000

[54] WHEEL HUB BEARING UNIT AND BRAKE CONNECTION

[75] Inventor: Andreas Rutter, Pinerolo, Italy

[73] Assignee: S.K.F. Industrie S.p.A., Turin, Italy

[21] Appl. No.: 09/021,801

[22] Filed: Feb. 11, 1998

[30] Foreign Application Priority Data

Feb. 21, 1997 [IT] Italy .................................. TO97A0143

[51] Int. Cl.[7] ........................................................ B60T 1/06
[52] U.S. Cl. ..................... 188/18 R; 188/17; 188/218 R; 188/206 R; 301/105.1
[58] Field of Search ..................................... 188/17, 18 R, 188/18 A, 218 R, 205 R, 206 R; 301/105.1, 6.1, 6.8, 6.7, 124.1, 108.1, 126, 131, 137; 384/537, 585

[56] References Cited

U.S. PATENT DOCUMENTS

| 1,816,643 | 7/1931 | Forsyth ................................. 301/108.1 |
| 1,966,169 | 7/1934 | Forbes .................................. 188/218 R |
| 5,048,859 | 9/1991 | Nishikuma et al. ................... 188/18 A |
| 5,772,285 | 6/1998 | Bigley et al. .......................... 188/18 A |
| 5,890,567 | 4/1999 | Pete et al. ............................. 188/218 R |
| 5,988,324 | 11/1999 | Bertetti et al. ....................... 188/18 A |
| 6,033,032 | 3/2000 | Rutter ........................................ 301/6.1 |

FOREIGN PATENT DOCUMENTS

| 0 783 980 | 7/1997 | European Pat. Off. . |
| 2 723 886 | 3/1996 | France . |
| 30 27 191 | 2/1982 | Germany . |
| WO 93 24761 | 12/1993 | WIPO . |
| WO 93/24761 | 12/1993 | WIPO . |

OTHER PUBLICATIONS

"Automotive hub design—part 2" Automotive Engineer, vol. 5, No. 1, 1980 pp. 62–63. St. Edmunds GB.

*Primary Examiner*—Michael Mar
*Assistant Examiner*—Thomas J. Williams
*Attorney, Agent, or Firm*—Merchant & Gould, P.C.

[57] ABSTRACT

In a vehicle wheel hub bearing unit and brake arrangement, the bearing forms a rotating radial flange (11) adapted for securing to a radial flange (12) of a brake member and rotate fixedly therewith. The brake member flange (12) is located substantially in the same radial plane of the bearing flange (11) and secured directly to the peripheral portion thereof. A form or splined connection (13, 14) couples the flanges (11, 12) in non-rotatable manner. The hub bearing flange (11) has a shoulder (15, 135) radially protruding from the axially inner side thereof so as to provide an axially inner abutment for the brake member flange (12). The brake member flange (12) is axially restrained from axial outward motion by the wheel rim (16, 21).

12 Claims, 6 Drawing Sheets

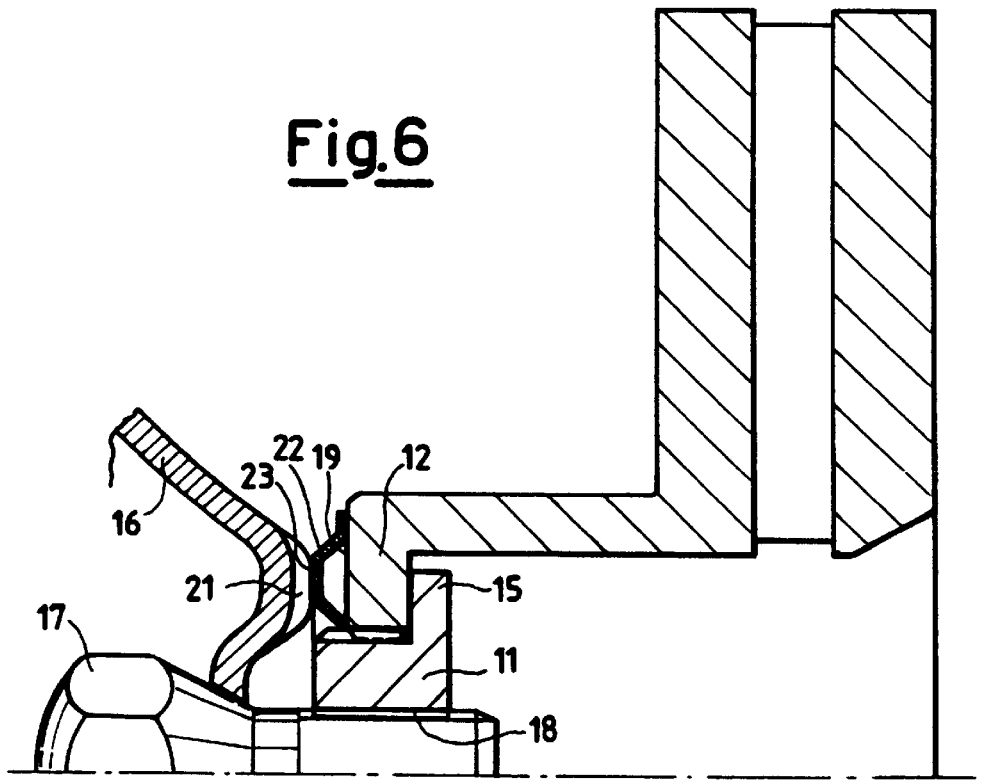
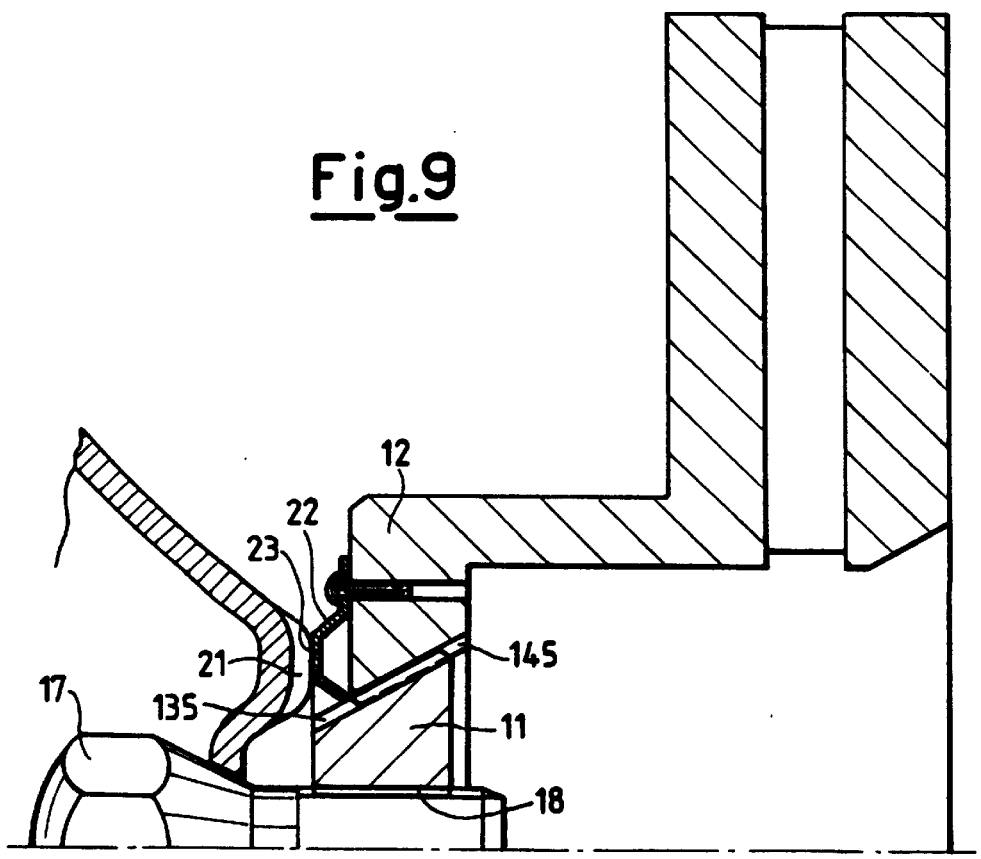

WHEEL HUB BEARING UNIT AND BRAKE CONNECTION

DESCRIPTION

The present invention relates to the connection of the brake to a vehicle wheel hub or hub bearing unit.

It is known that the part of the bearing of a vehicle wheel hub must be fixedly connected to the disc or drum brake member so as to transmit the braking torque from the brake to the wheel.

With most known solutions, the wheel is being used to clamp the brake rotor against the hub or hub bearing flange. The wheel rim, the brake member flange and the bearing flange are axially overlapping so as to interpose the brake member flange between the wheel and the bearing flange. These three bodies are jointed by screwing the wheel bolts with the prescribed tightening torque.

Tightening of the bolts causes axial compression of the central portion of the wheel rim on the brake flange and of the latter on the bearing flange. This coupling arrangement has a drawback in that owing to geometrical defects such a s planarity errors of the central part of the wheel rim, tightening of the bolts causes deformation of the braking surface and the bearing races.

A further drawback occurring is due to radial centering clearance of the brake/bearing coupling. Planarity errors of the relevant flanges concur in deforming the braking surface on tightening said bolts.

With other presently known solutions, the connection is such to allow to replace the brake rotor by using snap rings or threaded connections. Other solutions, such as that disclosed in WO 93/24761, make use of a shaping connection between the brake disc and a portion of a wheel carrier coaxial to the bearing, whilst still other solutions provide for permanent connection for the torque transmittal.

At present, there is an increasing demand in the automotive industry to decrease component and system weight whilst increasing car performance and reducing fuel consumption. This also applies to the braking system where the demand in terms of running accuracy of the brake rotor and sensitivity to distortions under operating conditions are constantly increasing. Very important in this respect is not only the distortion of the brake rotor in an assembled condition, when the wheel is mounted and the wheel bolts are tightened to the nominal torque as cited, but also the distortion of the braking surface under high temperature conditions.

It is a main object of the present invention to provide an improved connection of the brake to the bearing hub flange.

It a specific object of the present invention to provide a serviceable system that allows to change the brake rotor (specifically the brake disc) easily during service, since during the life of the car the brake disc is likely to be changed for wear reasons.

It is another object of this invention to provide an improved connection allowing to reduce the weight of the system.

A further object of the present invention is to provide an improved connection between the bearing and the brake member wherein tightening of the wheel bolts does not adversely affect the bearing races and the braking surface.

A still further object of the invention is to reduce considerably brake rotor distortion owing to high temperature.

It is another object of the present invention to provide a coupling arrangement between the brake member and the bearing having a reduced axial bulk.

A further object of the present invention is to provide a coupling arrangement which, although reducing overall axial bulk as compared to prior art, allows to mount a bearing flange which is thicker and, consequently, less likely to undergo deformation caused by the coupling to a non-planar rim.

In accordance with one aspect of the invention as claimed, these objects are accomplished by the provision of a vehicle wheel hub bearing unit and brake arrangement, of the type in which the bearing forms a rotating radial flange adapted for securing to a radial flange of a brake member and rotate fixedly therewith, characterised in that said brake member flange is located substantially in the same radial plane of said bearing hub unit flange, said brake member flange being secured directly to the peripheral portion of said bearing hub unit flange; a form connection coupling said flanges in non-rotatable manner; said hub bearing flange having a shoulder means radially protruding from the axially inner side thereof so as to provide an axially inner abutment for said brake member flange. The brake member flange is axially restrained from axial outward motion by the wheel rim.

According to another aspect of the invention, the brake member flange is axially restrained from axial outward motion by punchings performed on either of said flanges so as to retain said brake member flange against said shoulder means.

According to further aspect of the invention, the brake member flange is axially restrained from axial outward motion by elastically flexible means fitted to said brake member flange, said elastically flexible means being the adapted to snap fit into a recess means obtained in the bearing hub flange proximate to the axially outer side thereof, so as to retain said brake member flange against said shoulder means.

In order that the present invention may be well understood there will now be described a few preferred embodiments thereof, given by way of example, reference being made to the accompanying drawings, in which like elements have like numerals through out the several views, and in which:

FIG. 6 is a partial axial cross-sectional view of a third embodiment of the invention;

FIGS. 9, 10 and 11 are partial axial cross-sectional views illustrating a three further embodiments of the arrangement in accordance with this invention.

Figure 1A:
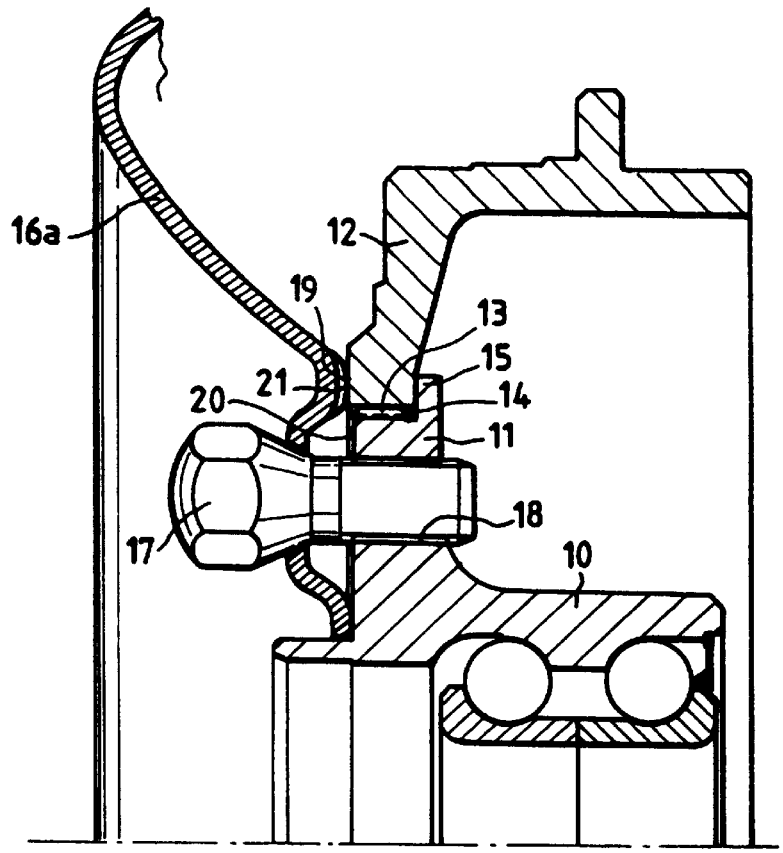
FIGS. 1A, 1B and 2 are partial axial cross-sectional views illustrating a first embodiment of the arrangement of this invention, applied to different kinds of brakes and wheels.
Figure 1B:
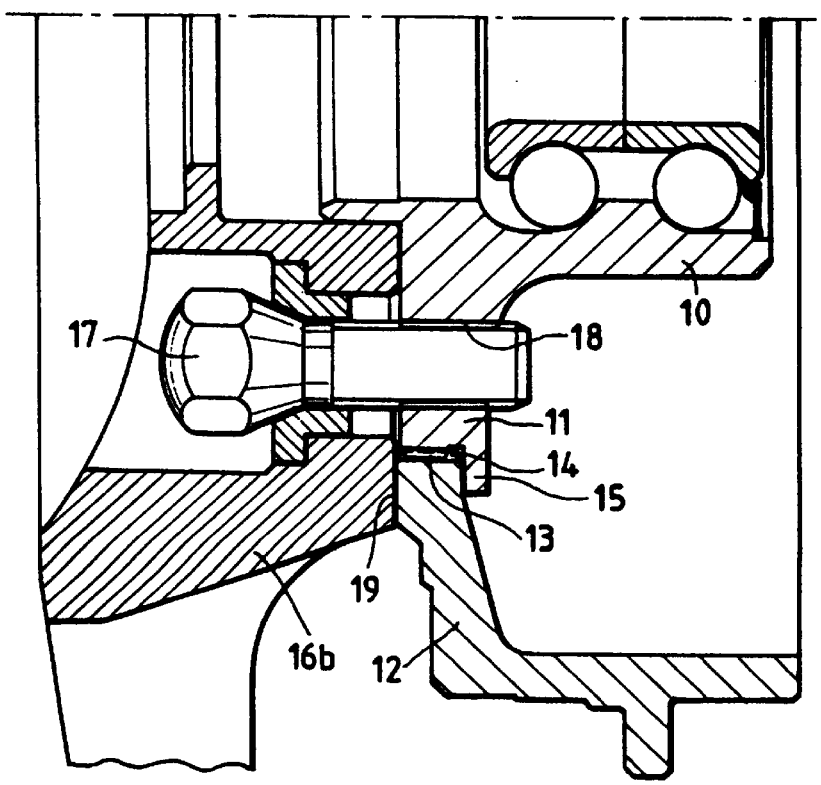
Figure 2:
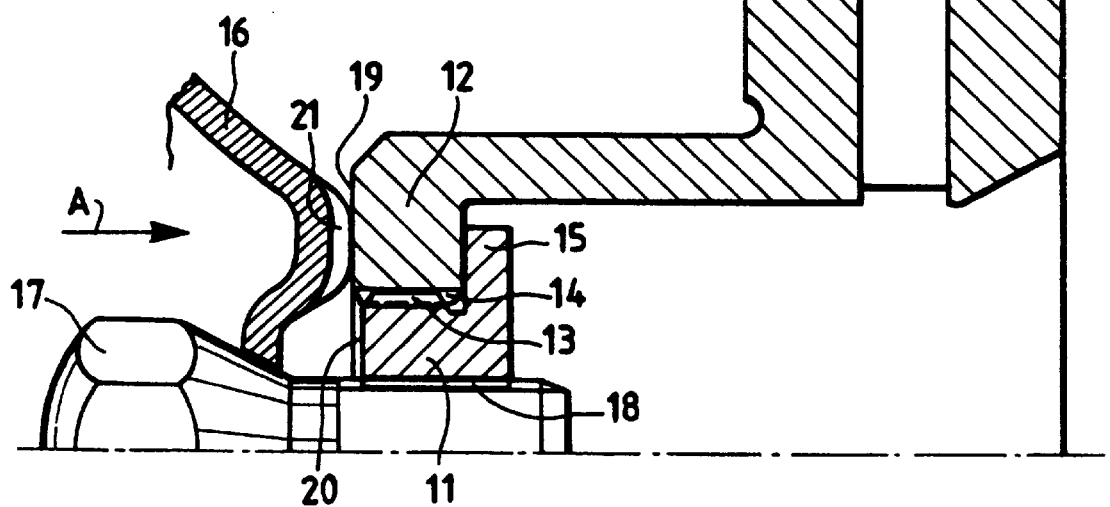

With reference initially to FIGS. 1A and 1B, the outer race 10 of a rolling contact bearing forms a radial bearing flange 11. The vehicle brake member may indifferently be of the drum type (FIGS. 1A, 1B) or disc type (FIG. 2), and forms a brake flange 12.

Figure 3:
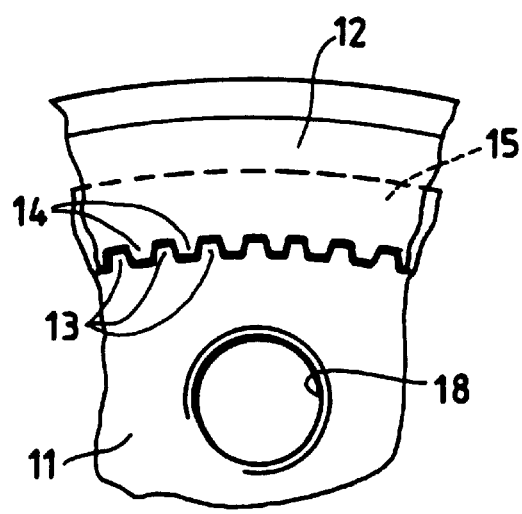
FIG. 3 is a partial and schematical front view according to arrow A of FIG. 2.

According to the present invention, bearing or hub flange 11 is peripherally secured to the brake member flange 12 substantially in the same radial plane. The braking torque is transmitted from the brake member to the hub by a form connection, preferably a splined connection (FIG. 3) comprised of corresponding axial splines 13, 14 obtained in the outer and inner diameters of flanges 11, 12, respectively.

The bearing flange 11 forms a shoulder 15 radially protruding from the axially inner side of the flange, i.e. on the inside of the vehicle. Shoulder 15 provides an axially inner abutment means against which the brake member can be pushed axially from the outside.

The brake member is then clamped axially against the shoulder 15 by fitting the wheel 16 (from the outside) and fixing it in removable manner to the bearing or hub flange 11 by fastening means such as conventional bolts 17 inserted in corresponding openings 18 obtained in flange 11. The wheel 16 urges axially at 21 against the axially outer, radial surface 19 of brake member flange 12. FIGS. 1A and 1B show two different kinds of conventional wheels 16a, 16b to which the principles of this invention apply.

Splines 13, 14 can either be disposed continuously over the whole circumferences of flanges 11, 12, or discretely only on parts thereof. The splines can either be rolled, formed broached or even machined on the bearing or hub flange and can be oriented according to different angles.

In a variant embodiment (not shown), the splines can be replaced by an equivalent form coupling arrangement, such as that of providing corresponding axial curved recesses in the peripheral portions of both flanges 11, 12, thereby determining apertures in which pins or other removable rigid elements (not shown) can be inserted so as to lock the two flanges circumferentially and ensure torque transmittal.

Figure 4:
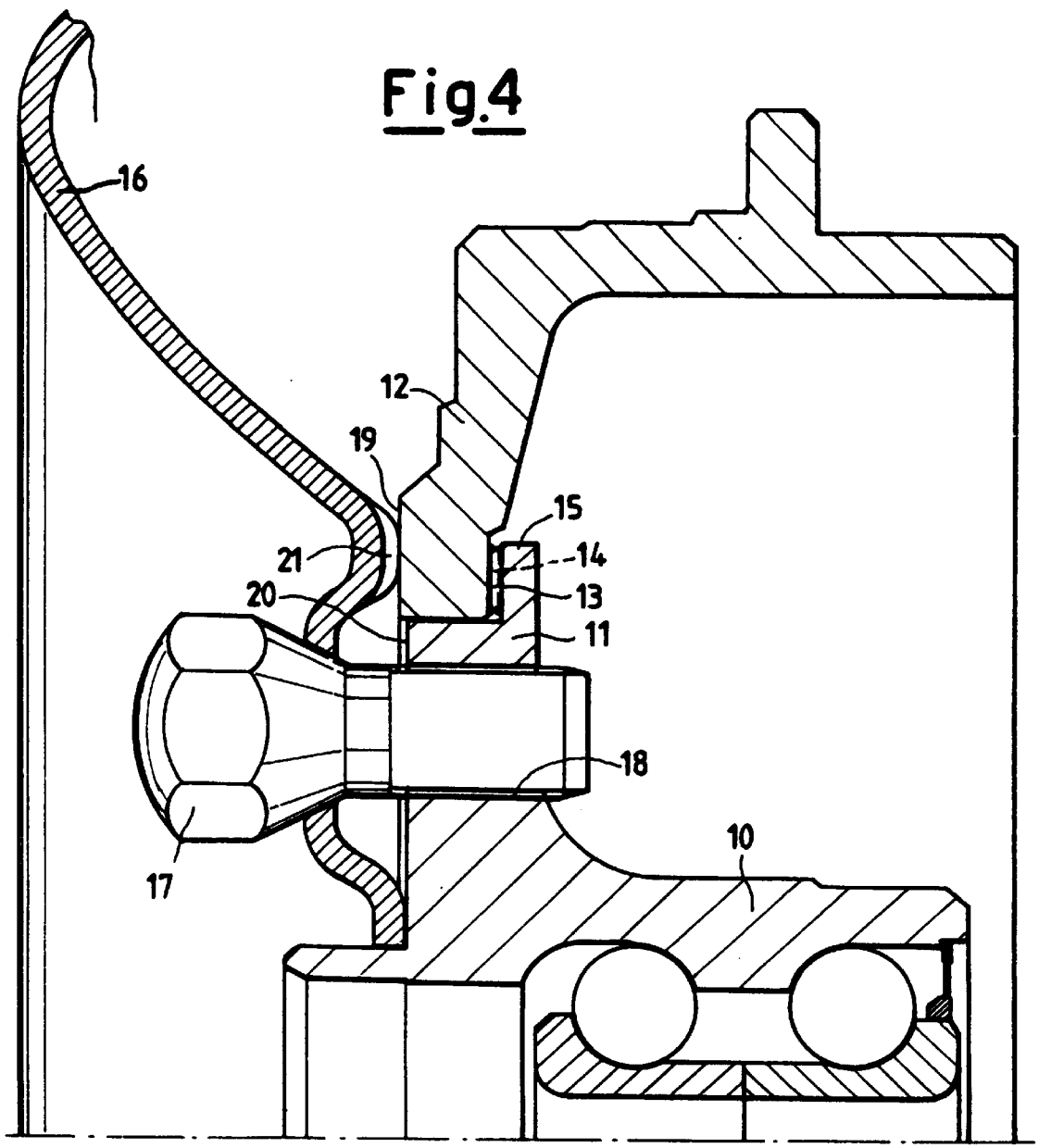
FIGS. 4 and 5 are a partial axial cross-sectional view and a front view, respectively of a second embodiment.
Figure 5:
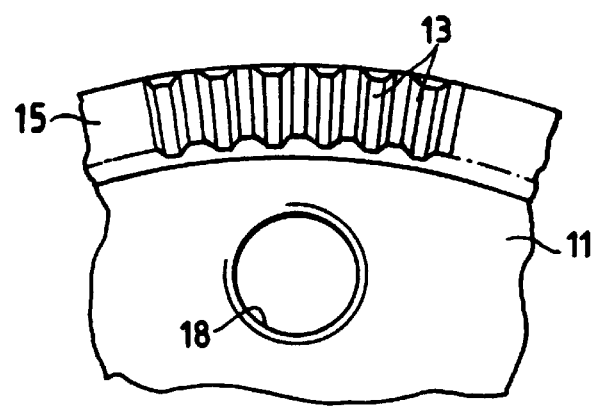

FIGS. 4 and 5 show another variant embodiment in which the splined connection 13, 14 providing torque transmittal is obtained in the radially protruding shoulder 15 and the axially inner radial surface of the brake member flange 12, respectively.

Still referring to FIGS. 1 and 4, the arrangement of this invention is preferably such that the axially outer, radial surface 19 of brake member flange 12 is slightly offset and protrudes axially from the outer side 20 of hub flange 11. In this way, the outer surface 19 of brake flange 12 can touch the wheel 16 at 21 and so clamp the brake member axially and efficiently upon tightening the wheel fastening bolts 17.

Referring to FIG. 6, there is illustrated a further embodiment in which the brake flange 12 is thinner in comparison with that of the previously discussed forms. In this further variant, an annular yieldable spacing insert 22, preferably resiliently yieldable (e.g. made of spring steel), is interposed axially between the wheel at 21 and the outer side 20 of brake flange 12 so as to ensure effective clamping action by the wheel when the bolts 17 are tightened. The axial dimension of insert 22 is appropriately chosen as to ensure axial thrust of the wheel to be transmitted to the brake and clamp it upon tightening of the bolts 17. In a preferred embodiment, the axially outer surface 23 of insert 22 will be slightly offset and axially protruding from the outer side surface 20 of the bearing flange 11 to clamp the brake member efficiently.

Figure 7:
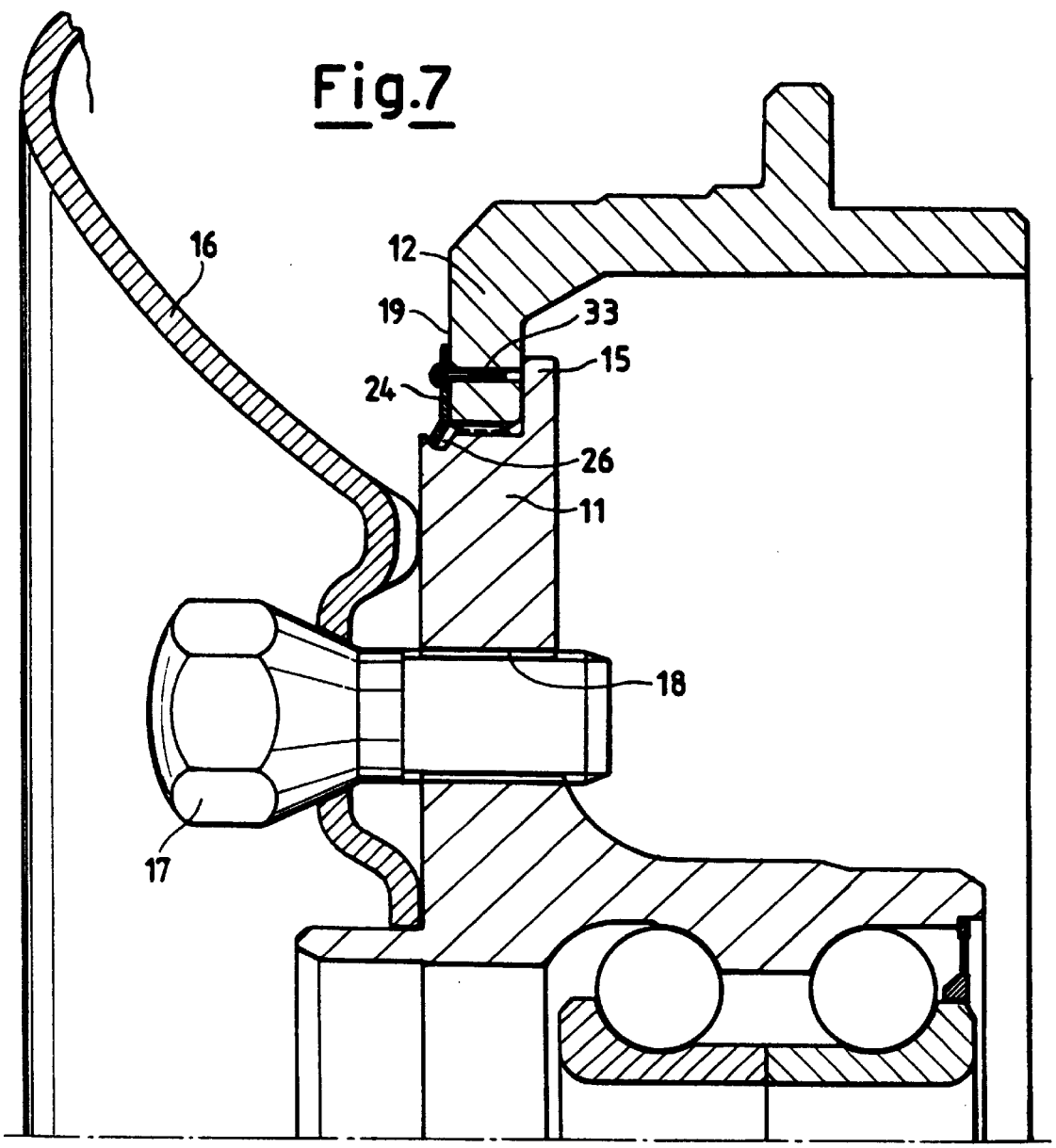
FIG. 7 is a partial axial cross-sectional view of a fourth embodiment.
Figure 8:
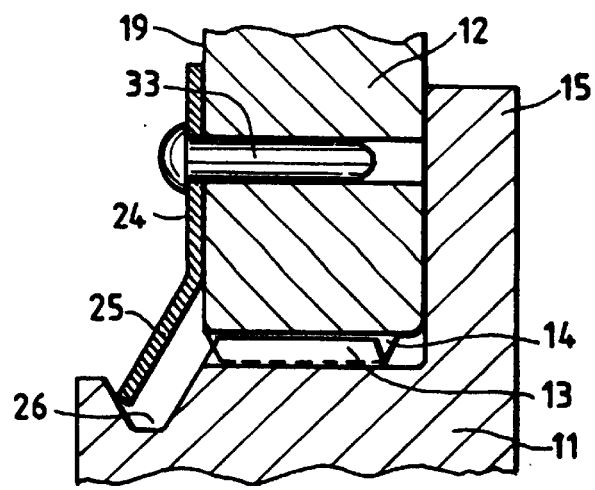
FIG. 8 shows a detail of FIG. 7 to an enlarged scale.

With reference to FIGS. 7 and 8, in a further embodiment of the present invention the wheel 16 does not provide the clamping action of the brake member, as discussed heretofore. In this further variant, a separate resiliently yieldable insert 24 of annular shape is fixed to the axially outer radial surface 19 of brake member flange 12 by pins 33 (or, alternatively, by other suitable fastening means). Insert 24 is provided with one or more flexible appendixes 25 adapted to snap fit into a corresponding circumferential groove 26 obtained in the bearing or hub flange 11 proximate to the axially outer side thereof. With this arrangement, the brake member having insert 24 already fitted can be easily mounted on the hub flange by simply pressing the brake member from the outside in the axial direction against the inner shoulder 15. Insert 24 acts as a stopping member which co-operates with groove 26 in preventing the brake from moving outwardly.

Referring now to FIG. 9, there is illustrated another variant form of this invention wherein a conical splined coupling 135, 145 is provided at the facing peripheral parts of flanges 11 and 12. In this arrangement, the splines lie on an axial conical surface converging towards the outside of the vehicle. There is no need, in this particular embodiment, to provide the distinct radially protruding rim 15 of the previously discussed variants, as in this case the conical inclined splines 135 of the bearing flange 11 act as an inner shoulder stopping inward axial movement of the brake. As already discussed with reference to FIG. 6, also in the embodiment of FIG. 9 an annular resiliently yieldable spacing insert 22 is preferably interposed axially between the wheel at 21 and the outer side 19 of brake flange 12 so as to push the brake inwards and ensure proper clamping action by the wheel when the wheel fastening bolts 17 are tightened.

Figure 10:
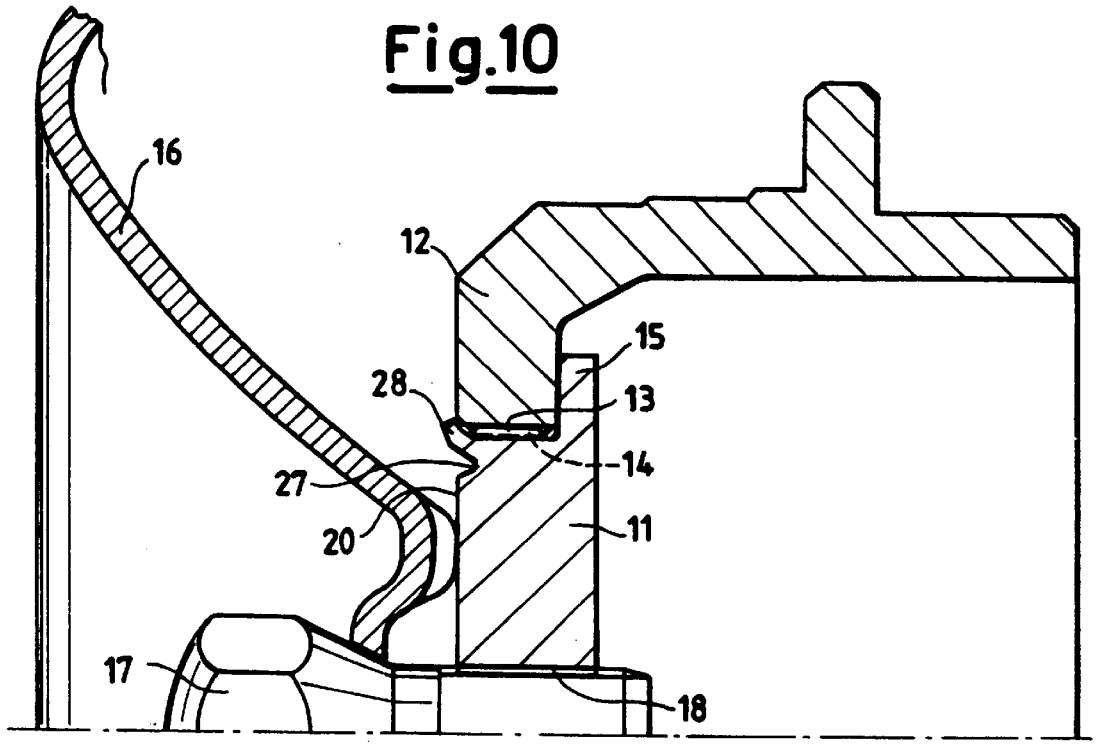

A further embodiment of the present invention is shown in FIG. 10 where the wheel rim is not used to stop the brake axially. Here again, the bearing or hub flange 11 is peripherally secured to the brake member flange 12 substantially in the same radial plane. The braking torque is transmitted from the brake member to the hub via a splined connection 13, 14; bearing flange 11 forms a shoulder 15 radially protruding from the axially inner side of the flange, said shoulder acting as an axially inner abutment means against which the brake member can be pushed axially from the outside.

Before mounting the wheel 16, axial locking of the brake member 12 is accomplished by randomly punching points 27 of the axially outer front face 20 of hub flange 11 close to its peripheral edge. Such a punching operation deforms peripheral portions 28 of the hub flange, thereby preventing axial displacement of the brake relative to the bearing. To this end, a segmental punch may be used.

Figure 11:
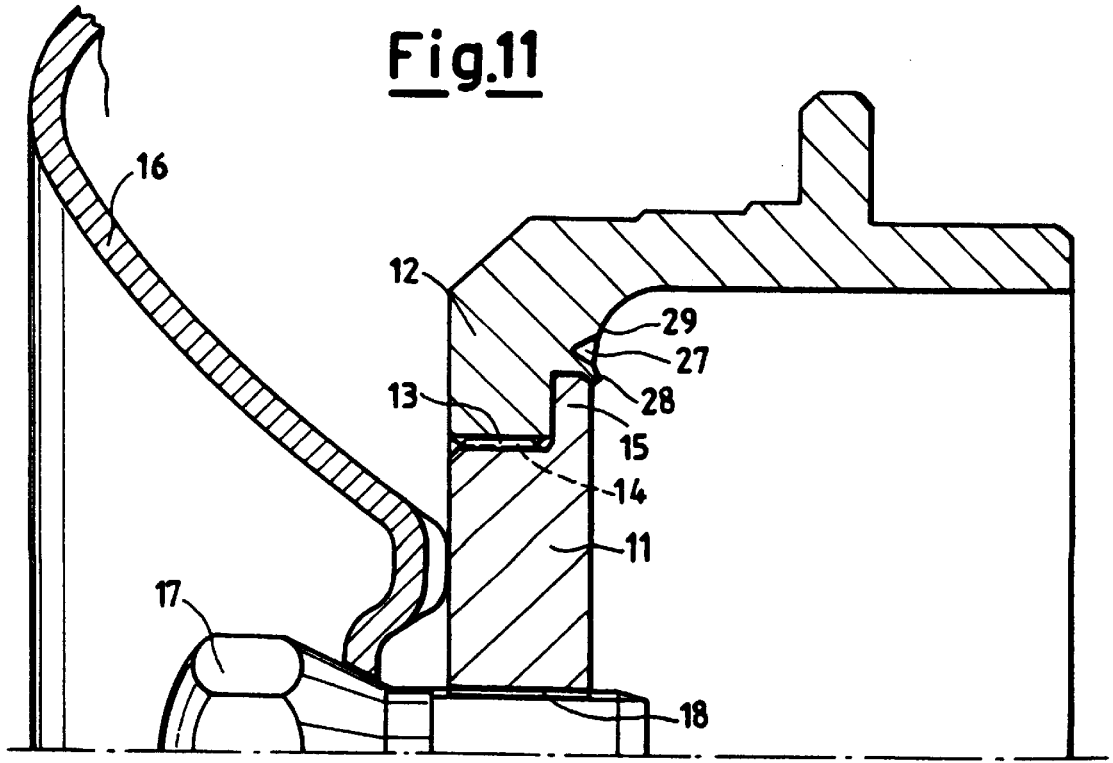

As apparent from FIG. 11, punching operation may indifferently be carried out on the brake or the bearing flange. In the still further embodiment of FIG. 11, punching is performed on the axially inner face 29 of the brake flange 12 close to its peripheral edge. Punching at 27 deforms peripheral portions 28 of the brake flange 12, still preventing axial displacement of the brake relative to the bearing.

The punching operation may indifferently be carried out on the axially inner or outer sides of the hub bearing and brake member flanges, attaining substantially the same operational advantages. The brake member can be forcefully removed from the hub bearing flange and fixed thereto again by performing new punchings at different locations angularly offset from the original ones.

It will be appreciated that the wheel is directly coupled to the bearing flange without interfering with the brake member. As both the bearing flange and the brake flange lie in substantially the same radial plane instead of being flanked, the bearing flange may be thicker and more rigid as compared to prior art solutions, overall bulk being equal. Hence, deformation of the braking surfaces due to coupling to a non-perfectly planar rim are minimised. Those skilled in the art will also appreciate that the present invention is particularly well suited for application with flanged bearings of the II and III generation. As compared to known solutions, the brake is coupled to the bearing flange on a smaller surface. This provision reduces the amount of heat being transmitted from the brake to the bearing.

Finally, the solution of the present invention is also cost effective in that the brake flange can be considerably smaller in comparison with prior art, whereby weight reduction is also achieved.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. Particularly, those parts having the purpose of mutually restraining the bearing hub flange to the brake member flange may be provided in other equivalent ways.

What is claimed is:

1. A vehicle wheel hub bearing unit and brake arrangement, of the type in which the bearing forms a first radial flange, which is a rotating radial flange adapted for securing to a second radial flange of a brake member and rotate fixedly therewith, wherein
    a) said second radial flange is located substantially in the same radial plane of said first flange;
    b) said second flange is secured directly to a peripheral portion of said first radial flange;
    c) a form connection couples said flanges in non-rotatable manner;
    d) said first radial flange has a shoulder means radially protruding from the axially inner side thereof so as to provide an axially inner abutment for said second flange;
    e) anti-axial outward motion means are provided to axially restrain said second radial flange from axial outward motion; and
    f) wherein an annular yieldable spacing insert is axially interposed between the wheel and the axially outer side of the second flange.

2. An arrangement as claimed in claim 1, wherein the axially outer, radial surface of said second radial flange is axially protruding from the outer side of said hub bearing flange when the second radial flange abuts against said shoulder means.

3. An arrangement as claimed in claim 1, wherein said annular spacing insert is resiliently yieldable.

4. An arrangement as claimed in claim 1, wherein said insert has an axially outer surface axially protruding from the axially outer side surface of the first radial flange when the second flange abuts against said shoulder means.

5. An arrangement as claimed in claim 1, wherein said form connection is an axial form connection.

6. An arrangement as claimed in claim 5, wherein said axial form connection is a splined connection.

7. An arrangement as claimed in claim 1, wherein said form connection is a radial splined connection.

8. An arrangement as claimed in claim 7, wherein said radial splined connection is obtained in said radially protruding shoulder means.

9. A vehicle wheel hub bearing unit and brake arrangement, of the type in which the bearing forms a first radial flange, which is a rotating radial flange adapted for securing to a second radial flange of a brake member and rotate fixedly therewith, wherein
    a) said second radial flange is located substantially in the same radial plane of said first flange;
    b) said second flange is secured directly to a peripheral portion of said first radial flange;
    c) a form connection couples said flanges in non-rotatable manner;
    d) said first radial flange has a shoulder means radially protruding from the axially inner side thereof so as to provide an axially inner abutment for said second flange;
    e) anti-axial outward motion means are provided to axially restrain said second radial flange from axial outward motion; and
    f) wherein said form connection is a conical splined connection, the splines being disposed on an axial conical surfaces converging towards the outside of the vehicle.

10. An arrangement as claimed in claim 9, wherein the splines of said conical splined connection are radially inner splines and form said shoulder means.

11. A vehicle wheel hub bearing unit and brake arrangement, of the type in which the bearing forms a first radial flange, which is a rotating radial flange adapted for securing to a second radial flange of a brake member and rotate fixedly therewith, wherein
    a) said second radial flange is located substantially in the same radial plane of said first flange;
    b) said second flange is secured directly to a peripheral portion of said first radial flange;
    c) a form connection couples said flanges in non-rotatable manner;
    d) said first radial flange has a shoulder means radially protruding from the axially inner side thereof so as to provide an axially inner abutment for said second flange;
    e) anti-axial outward motion means are provided to axially restrain said second radial flange from axial outward motion; and
    f) wherein said anti-axial outward motion means are defined by elastically flexible means fitted to said second radial flange, said elastically flexible means being adapted to snap fit into a recess means obtained in the first radial flange proximate to the axially outer side thereof, so as to retain said second radial flange against said shoulder means.

12. A vehicle wheel hub bearing unit and brake arrangement, of the type in which the bearing forms a first radial flange, which is a rotating radial flange adapted for securing to a second radial flange of a brake member and rotate fixedly therewith, wherein
    a) said second radial flange is located substantially in the same radial plane of said first flange;
    b) said second flange is secured directly to a peripheral portion of said first radial flange;
    c) a form connection couples said flanges in non-rotatable manner;
    d) said first radial flange has a shoulder means radially protruding from the axially inner side thereof so as to provide an axially inner abutment for said second flange;
    e) anti-axial outward motion means are provided to axially restrain said second radial flange from axial outward motion; and
    f) wherein said anti-axial outward motion means are defined by a wheel rim.

* * * * *